United States Patent
Abdallah et al.

(10) Patent No.: US 8,489,239 B2
(45) Date of Patent: Jul. 16, 2013

(54) ROBUST OPERATION OF TENDON-DRIVEN ROBOT FINGERS USING FORCE AND POSITION-BASED CONTROL LAWS

(75) Inventors: Muhammad E Abdallah, Houston, TX (US); Robert J. Platt, Jr., Cambridge, MA (US); Matthew J Reiland, Oxford, MI (US); Brian Hargrave, Dickenson, TX (US); Myron A Diftler, Houston, TX (US); Philip A Strawser, Houston, TX (US); Chris A. Ihrke, Hartland, MI (US)

(73) Assignees: GM Global Technology Operations LLC, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 353 days.

(21) Appl. No.: 12/916,803

(22) Filed: Nov. 1, 2010

(65) Prior Publication Data
US 2012/0109379 A1 May 3, 2012

(51) Int. Cl.
*G06F 19/00* (2011.01)
*G05B 15/00* (2006.01)
*G05B 19/00* (2006.01)

(52) U.S. Cl.
USPC .......................................... 700/260; 700/245

(58) Field of Classification Search
USPC .................................. 700/245–264
See application file for complete search history.

(56) References Cited

U.S. PATENT DOCUMENTS

| | | | | |
|---|---|---|---|---|
| 4,246,661 A | * | 1/1981 | Pinson | 623/25 |
| 5,954,677 A | * | 9/1999 | Albrecht et al. | 602/16 |
| 5,954,692 A | * | 9/1999 | Smith et al. | 604/95.01 |
| 6,244,644 B1 | | 6/2001 | Lovchik et al. | |
| 6,344,062 B1 | * | 2/2002 | Abboudi et al. | 623/24 |
| 6,918,622 B2 | * | 7/2005 | Kim et al. | 294/106 |
| 7,795,832 B2 | * | 9/2010 | Kawabuchi et al. | 318/568.11 |
| 2011/0040408 A1 | * | 2/2011 | De La Rosa Tames et al. | 700/258 |

FOREIGN PATENT DOCUMENTS

| | | |
|---|---|---|
| JP | 03196983 A | 8/1991 |
| JP | 0728502 A | 1/1995 |
| JP | 09185416 A | 7/1997 |

(Continued)

OTHER PUBLICATIONS http://robotics.nasa.gov/courses/fall2002/event/oct1/NASA_Robotics_20021001.htm.

*Primary Examiner* — Bhavesh V Amin
(74) *Attorney, Agent, or Firm* — Quinn Law Group, PLLC (57) ABSTRACT

A robotic system includes a tendon-driven finger and a control system. The system controls the finger via a force-based control law when a tension sensor is available, and via a position-based control law when a sensor is not available. Multiple tendons may each have a corresponding sensor. The system selectively injects a compliance value into the position-based control law when only some sensors are available. A control system includes a host machine and a non-transitory computer-readable medium having a control process, which is executed by the host machine to control the finger via the force- or position-based control law. A method for controlling the finger includes determining the availability of a tension sensor(s), and selectively controlling the finger, using the control system, via the force or position-based control law. The position control law allows the control system to resist disturbances while nominally maintaining the initial state of internal tendon tensions.

18 Claims, 4 Drawing Sheets

FOREIGN PATENT DOCUMENTS

| | | |
|---|---|---|
| JP | 11247807 A | 9/1999 |
| JP | 2005092763 A | 4/2005 |
| JP | 2006127047 A | 5/2006 |
| JP | 2007045271 A | 2/2007 |
| JP | 2010117347 A | 5/2010 |
| JP | 2010149274 A | 7/2010 |
| JP | 2011143528 A | 7/2011 |

* cited by examiner

ROBUST OPERATION OF TENDON-DRIVEN ROBOT FINGERS USING FORCE AND POSITION-BASED CONTROL LAWS

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present invention relates to a system and a method for providing robust operation of tendon-driven robotic fingers in a robotic system.

BACKGROUND

Robots are automated devices able to manipulate objects using a series of links. The links are interconnected by one or more actuator-driven robotic joints. Each joint in a typical robot represents at least one independent control variable, or a degree of freedom. End-effectors are the particular manipulators used to perform a task at hand, such as grasping a work tool. Therefore, precise motion control of the various robotic manipulators helps to achieve the required mobility, dexterity, and work task-related functionality.

Dexterous robots may be used where a direct interaction is required with devices or systems specifically designed for human use, i.e., devices requiring human-like levels of dexterity to properly manipulate. The use of dexterous robots may also be preferred where a direct interaction is required with human operators, as the motion of the robot can be programmed to approximate human motion. Such robots may include a plurality of fingers that can be actuated remotely using tendons, thus reducing the overall size and weight of the robot. Such tendons must be kept taut at all times to within a calibrated tension level.

SUMMARY

Accordingly, a control system and method are disclosed herein for controlling a tendon-driven finger of a dexterous robot. The present control system, by executing the method as disclosed herein, achieves active compliance in the finger so that the finger may safely contact an object in its environment while also allowing for operation of the finger under degraded sensor conditions. This is achieved by a flexible two-tiered control architecture in which an upper control loop employs either a force-based or a position-based control law for a given finger. In turn, a position-based control law can incorporate active compliance selectively for any tendons that it is controlling.

The control law that is selected depends on whether all, none, or some of a number of tension sensors within the finger are available during a given maneuver. Typically, a control law for tendon-driven fingers needs tension feedback to maintain the internal tension on the tendons. The position control law presented here nominally maintains the internal tension by implementing the two-tier control architecture with a range-space constraint as set forth herein.

As used herein, the terms "force-based control law" and "position-based control law" refer to control of a robot relying on respective force or position commands and feedback signals, as is understood in the art. The flexible control scheme is finger-specific, i.e., the various tendon-driven fingers on a given robotic hand can have a different control law operating for that finger at any moment relative to the other fingers.

In particular, a robotic system includes a robotic finger driven by a tendon, a tension sensor, and a control system. The tendon is controlled by an actuator. The control system selectively controls the finger via a force-based control law when the tension sensor is available to measure the tension value, and via a position-based control law when the tension sensor is not available.

A plurality of tendons may be used, each having a corresponding tension sensor. The control system can selectively inject a compliance value to the position-based control law when only some of the tension sensors are available. The compliance value may be a function of a tension error, which can be determined as the difference between a desired tension and an actual tension of one of the tendons.

A control system for a robotic finger driven by a tendon includes a tension sensor and a host machine. The tension sensor is positioned to measure a tension value of the tendon, and the host machine is configured for determining the availability of the tension sensor for measuring the tension value. Additionally, the host machine is configured for selectively controlling the finger via a force-based control law when the tension sensor is available to measure the tension value, and via a position-based control law when the tension sensor is not available to measure the tension value.

A method is also provided for controlling a tendon-driven finger in a robotic system. The method includes determining the availability of a tension sensor for measuring a tension value of the tendon, and then selectively controlling the finger, via a control system, using a force-based control law when the tension sensor is available to measure the tension value, and using a position-based control law when the tension sensor is not available to measure the tension value.

The above features and advantages and other features and advantages of the present invention are readily apparent from the following detailed description of the best modes for carrying out the invention when taken in connection with the accompanying drawings.

DESCRIPTION

Figure 1:
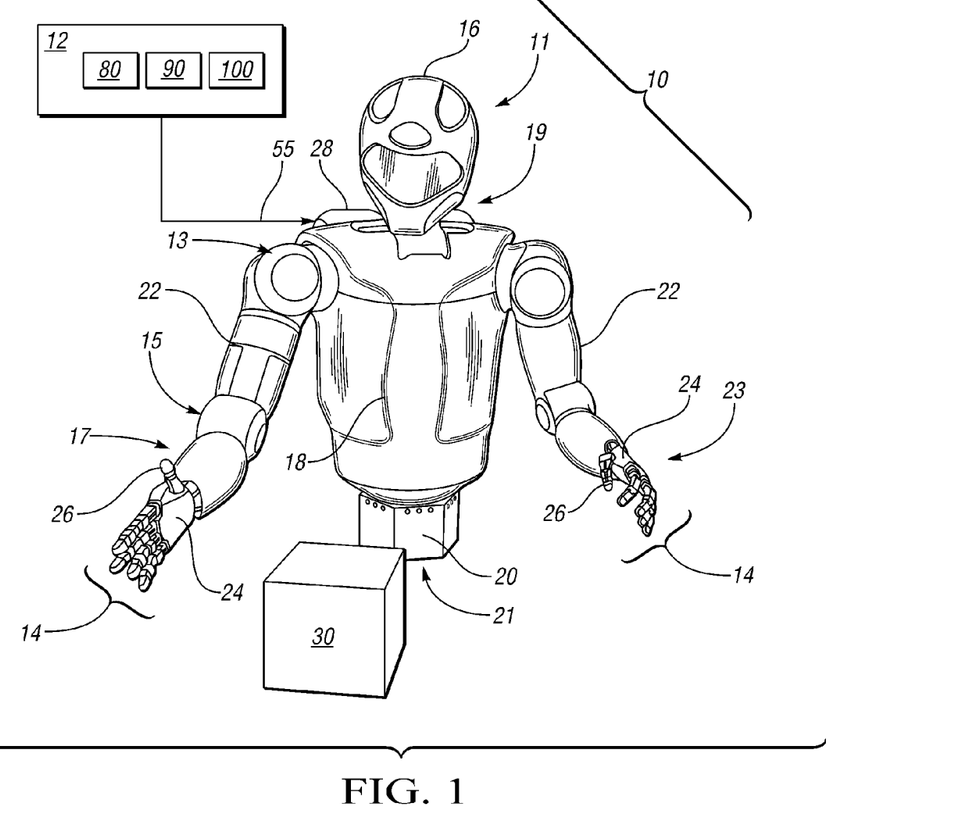
FIG. 1 is a schematic illustration of a robotic system having a robot with tendon-driven fingers controlled as set forth herein.

With reference to the drawings, wherein like reference numbers refer to the same or similar components throughout the several views, and beginning with FIG. 1, a robotic system 10 is shown that includes a dexterous robot 11 and a control system 12. The robot 11 includes various manipulators, including a plurality of tendon-driven fingers 14. The control system 12 for robot 11 operates via a two-tier control hierarchy or architecture. As used herein, the term "two-tier" means that a first or upper tier control controller, shown in FIG. 1 as a joint controller 80, operates at a higher hierarchical level than a second or lower tier control law or controller, shown in FIG. 1 as an actuator controller 90. The controllers 80 and 90 may be embodied as two different processors and related hardware devices, or alternatively as nested software-based control loops each resident in a single or in a distributed hardware device and automatically executed by one or more processors.

The joint controller 80 uses either force- or position-based control laws in a higher loop to control the position of various finger joints (see FIG. 4), depending on which control law is selected. Selection of the particular control law by the control system is based on the availability of the tension sensors 58 (see FIG. 3) that are available, i.e., online and fully functional, in a given finger 14. The actuator controller 90 uses the position-based control in a lower loop to control the position of a tendon 50 (see FIG. 3) of a given finger 14.

Figure 3:
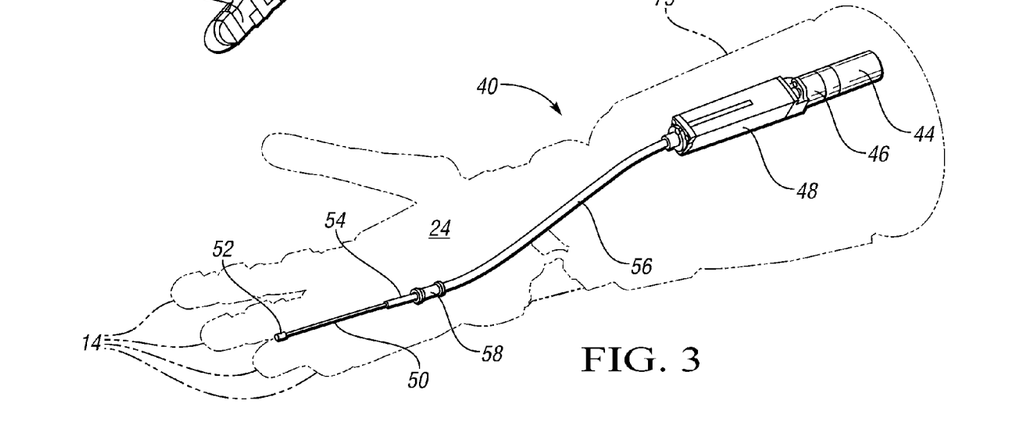
FIG. 3 is a schematic perspective view illustration of a tendon and actuator usable for controlling the robotic fingers shown in FIG. 2.

The control system 12 of FIG. 1 automatically maintains sufficient tension on the tendons 50 shown in FIG. 3. Typically, a force-based control law is used to regulate tendon tensions, such as via closed-loop force feedback. However, the physical sensors used to measure tension may be less than optimally robust. As a result, all of some of the tension sensors positioned in or along a finger 14 of robot 11 may or may not be available for use at any particular moment. Therefore, the control system 12 is configured to automatically and individually control each of the fingers 14 using the joint and actuator controllers 80 and 90, respectively, according to force or position control laws, and with or without selective compliance as explained below. Within the joint controller 80, the particular control law being applied, i.e., force or position, is selected in a manner that is dependent upon the number of available tension sensors for a given finger 14.

In one possible embodiment, the robot 11 shown in FIG. 1 may be configured with human-like appearance, and with human-like levels of dexterity to the extent necessary for completing a given work task. Humanoids and other dexterous robots can be used where a direct interaction is required with devices or systems specifically designed for human use, for example any devices requiring human-like levels of dexterity to properly manipulate an object 30. The use of a humanoid such as the robot 11 depicted in FIG. 1 may be preferred where a direct interaction is required between the robot and human operators, as motion of the robot can be programmed to closely approximate human motion. The fingers 14 of robot 11 are directly controlled by hardware components of the control system 12, e.g., a host machine, server, or network of such devices, via a set of control signals 55 during the execution of any maneuver or work task in which the robot acts on the object 30.

The robot 11 shown in FIG. 1 may be programmed to perform automated tasks with multiple degrees of freedom (DOF), and to perform other interactive tasks or to control other integrated system components, e.g., clamping, lighting, relays, etc. According to one possible embodiment, the robot 11 may have a plurality of independently- and interdependently-moveable actuator-driven robotic joints, some of which have overlapping ranges of motion. In addition to the various joints 23 of the fingers 14, which separate and move the various phalanges thereof, the robotic joints of robot 11 may include a shoulder joint, the position of which is generally indicated in FIG. 1 by arrow 13, an elbow joint (arrow 15), a wrist joint (arrow 17), a neck joint (arrow 19), and a waist joint (arrow 21).

Still referring to FIG. 1, each robotic joint may have one or more DOF. For example, certain compliant joints such as the shoulder joint (arrow 13) and the elbow joint (arrow 15) may have at least two DOF in the form of pitch and roll. Likewise, the neck joint (arrow 19) may have at least three DOF, while the waist and wrist (arrows 21 and 17, respectively) may have one or more DOF. Depending on task complexity, the robot 11 may move with over 42 DOF. Each robotic joint contains and is internally driven by one or more actuators, for example joint motors, linear actuators, rotary actuators, and the like.

Figure 2:
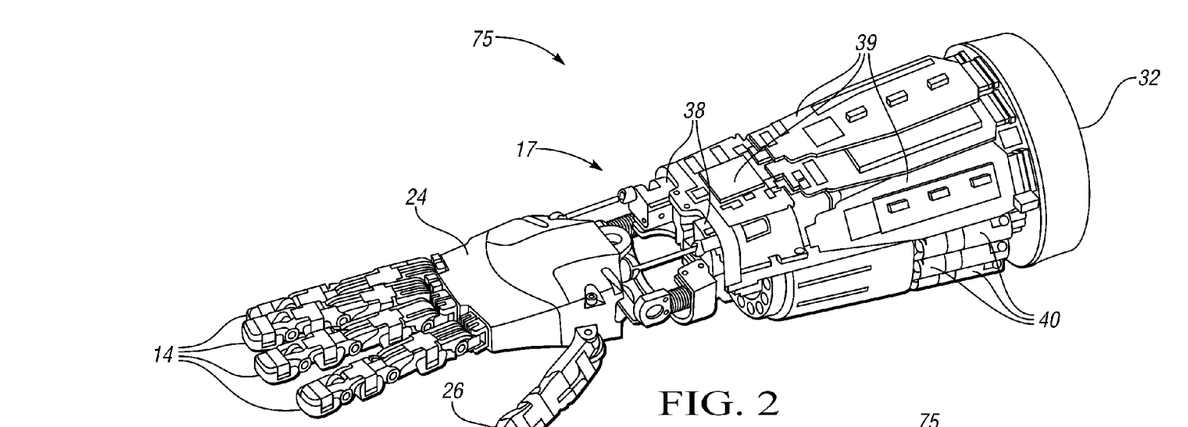
FIG. 2 is a schematic perspective view illustration of a lower arm assembly for the robot shown in FIG. 1, with the arm assembly including a plurality of tendon-driven robotic fingers.

In one possible embodiment, the robot 11 may include just the lower arm assembly 75 shown in FIG. 2. In another embodiment, the robot 11 may include additional human-like components such as a head 16, a torso 18, a waist 20, arms 22, hands 24, fingers 14, and opposable thumbs 26, with the various joints noted above being disposed within or between these components. As with a human, both arms 22 and other components may have ranges of motion that overlap to some extent. The robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of the torso 18 or another suitable energy supply, or which may be attached remotely through a tethering cable, to provide sufficient electrical energy to the various joints for movement of the same.

The control system 12 and each of the controllers 80 and 90 thereof may each be embodied, as noted elsewhere above, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics.

While shown as a single device in FIG. 1 for simplicity and clarity the various elements of control system 12 may be distributed over as many different hardware and software components as are required to optimally control the robot 11. The individual control algorithms resident in the control system 12 or readily accessible thereby may be stored in ROM or other suitable tangible memory location and/or memory device, and automatically executed by associated hardware components of the control system to provide the respective control functionality.

Referring to FIG. 2, a lower arm assembly 75 can be used as part of the robot 11 shown in FIG. 1. Each lower arm assembly 75 includes a hand 24 having a plurality of tendon-driven fingers 14 and a tendon-driven thumb 26. The term "tendon-driven" is explained below with reference to FIG. 3. The lower arm assembly 75 includes a plurality of finger actuators 40 each configured for selectively pulling on and releasing one or more tendons 50 (see FIG. 3) in a finger 14 or in a thumb 26. The lower arm assembly 75 further includes a plurality of wrist actuators 38 for moving the wrist joint (arrow 17). Printed circuit board assemblies (PCBA) 39 for the finger actuators 40 and/or the wrist actuators 38 may be positioned on or within the lower arm assembly 75 as shown for packing efficiency. The lower arm assembly 75 may be attached to a load cell 32, which is used to connect the lower arm assembly to the rest of the arm 22 of the robot 11 shown in FIG. 1.

Multiple finger actuators 40 may correspond to each finger 14 and thumb 26. In general, one finger actuator 40 is used for each DOF available plus one additional finger actuator. Therefore, each finger 14 having three DOF requires four finger actuators 40, while each finger having two DOF requires three finger actuators, etc.

Referring to FIG. 3, a schematic perspective view is provided of a possible embodiment of the finger actuator 40. The finger actuator 40 may include a motor 44, a gear drive 46, an actuator housing 48, a tendon 50, and a tendon terminator 52. The tendon 50 extends from the actuator housing 48 and through one of the fingers 14, terminating at the end of the finger. The tendon 50 is illustrated in an off-center position within the finger 14, as more than one tendon may extend within a given finger. The motor 44, gear drive 46, and actuator housing 48 may all be located in the lower arm assembly 75 in order to minimize the packaging space required within the fingers 14 and the thumb 26, and to allow for the larger components of the finger actuator 40, such as the actuator housing 48, to be remotely packaged with respect to the fingers and thumb.

The tendon 50 may be protected by a sheath or conduit liner 54 positioned within a protective outer conduit 56. The tension sensor 58 measures the force of compression on the conduit 56 to determine the amount of tension placed on the tendon 50. Tension in the tendons 50 can be used by the control system 12 shown in FIG. 1 to calculate the joint torques generated or experienced at the various joints of a given finger 14, which in turn can be used by the control system for control of the fingers and thumbs 26 of a given hand 24.

As the finger actuator 40 moves the tendon 50, the tendon slides relative to the tension sensor 58. The tendon 50 terminates within the finger 14 at the tendon terminator 52. Movement of the tendon 50 causes relative movement of the tendon terminator 52, thereby moving the finger 14. Force may be placed on the tendon terminator 52 either internally, i.e., by movement of the finger actuator 40, or externally, i.e., on the finger 14 by the object 30 of FIG. 1, which causes the tendon 50 to exert force on the actuator housing 48.

Figure 4:
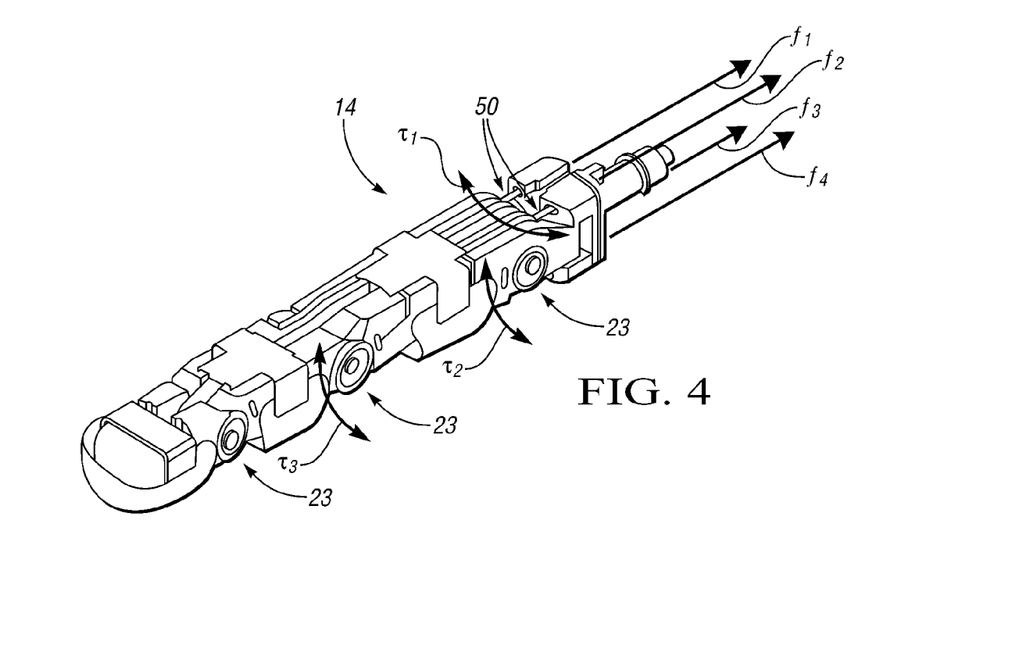
FIG. 4 is a schematic perspective view of a tendon-driven robotic finger.

Referring to FIG. 4, the control system 12 of FIG. 1 is used as set forth herein to individually control each finger 14 with respect to any other finger of a given hand 24. In the torque control of a tendon-driven finger, the desired joint torques must first be translated into tendon tension values. This problem is referred to as tension distribution, and it must ensure that each tension value is non-negative. The finger 14 has a plurality of finger joints 23, some of which are independent joints, with the joint positions and joint torques of each finger joint indicated by arrows $\tau_1$, $\tau_2$, and $\tau_3$. The finger 14 has n independent joints (n DOF) and n+1 tendons 50.

The finger 14 shown in FIG. 4 has 3 DOF, therefore there are four tendons 50 in this particular embodiment, although more or fewer tendons and/or DOF may also be used without departing from the intended inventive scope. Note that the distal joint is mechanically coupled to the adjacent joint, i.e., the medial joint; hence, the distal joint is not an independent DOF. Also, control of the finger 14 is fully determined, as that term is understood in the art, and therefore the number of tendons 50 is n+1, or 4 in the particular embodiment shown in FIG. 4. Each independent joint 23 is characterized by a joint torque $\tau$ and a joint position q. Each of the tendons 50 is characterized by a tension f, represented in FIG. 4 as $f_1$, $f_2$, $f_3$ and $f_4$, or generally, as $f_1$ through $f_{2+1}$. The tendons 50 each have a determinable position (x), i.e., $x_1$-$x_4$.

The relationship between the n joint torques and m tendon tensions, where m>n, is represented as $\tau = Rf$. The variable $R \in \mathfrak{R}^{n \times m}$ is known as a tendon map, and it contains the various joint radii data needed for mapping tendon tensions to joint torques. For a system to be tendon-controllable, the tendon map R must be a full row rank, and there must be an all-positive column matrix, w, such that $R^T w = 0$. The "internal tension" is a weighted sum of all the tensions in a finger 14; hence, a smaller internal tension indicates smaller tensions amongst the various tendons 50 and a smaller net force.

Inversely, the solution for tension f follows, where $R^+$ is the pseudoinverse of R, I is the identity matrix, and 2 is an arbitrary value:

$$f = R^+ \tau + f_{int}$$

$$f_{int} \doteq (I - R^+ R) \lambda$$

where $f_{int}$ represents the internal tensions lying in the null-space of R and producing zero net torques. The matrix $[I - R^+ R]$ provides the projection operator into the null space of R. Given quasi-static conditions, $f = f_{int}$ whenever zero external forces act on the finger 14.

The same matrix R expresses the relationship between a tendon 50 and joint velocities. Based on the principals of virtual work, the contribution of the joint motion to the tendon velocity equals $R^T \dot{q}$. Assuming a constant value for R, the net displacement of a tendon 50 is a sum of the joint contribution plus the change in length l of that tendon, or:

$$\Delta x = R^T \Delta q + \Delta l.$$

We will now provide a model of tendon 50 as a linear spring and assume that the tendon will remain taut. We will also assume that the tendons 50 used in a finger 14 have the same stiffness value, $k_t$, since the difference in tendon lengths is not sufficient to warrant a significant difference in stiffness. The following analysis relates the change in length ($\Delta l$) to a change in tendon tensions and joint torques:

$$\Delta f = k_t \Delta l$$

$$\Delta \tau = R \Delta f$$

$$= k_t R \Delta l$$

hence, $$\Delta l = \frac{1}{k_t} R^+ \Delta \tau + \Delta l_{int}.$$

The value ($\Delta l_{int}$), which represents the change in length in the null-space of R, i.e., the change in length that affects only the internal tensions and not the joint torques, can be written as:

$$\Delta l_{int} \doteq (I - R^+ R) \delta,$$

where the value of variable $\delta$ is arbitrary. The final relation for tendon displacement may be written as:

$$\Delta x = R^T \Delta q + \frac{1}{k_t} R^+ \Delta \tau + \Delta l_{int}.$$

In the absence of tension feedback, e.g., when some or all of the tension sensors 58 of FIG. 3 are not available for use within a given finger 14, the position laws used by the control system 12 of FIG. 1 provide fast position-based control performance, low error, and no overshoot, while at the same time maintaining the internal tension of the tendons 50 in the finger. To keep the internal tension constant, the value $\Delta l_{int}$ is eliminated from the equation appearing immediately above.

Figure 5:
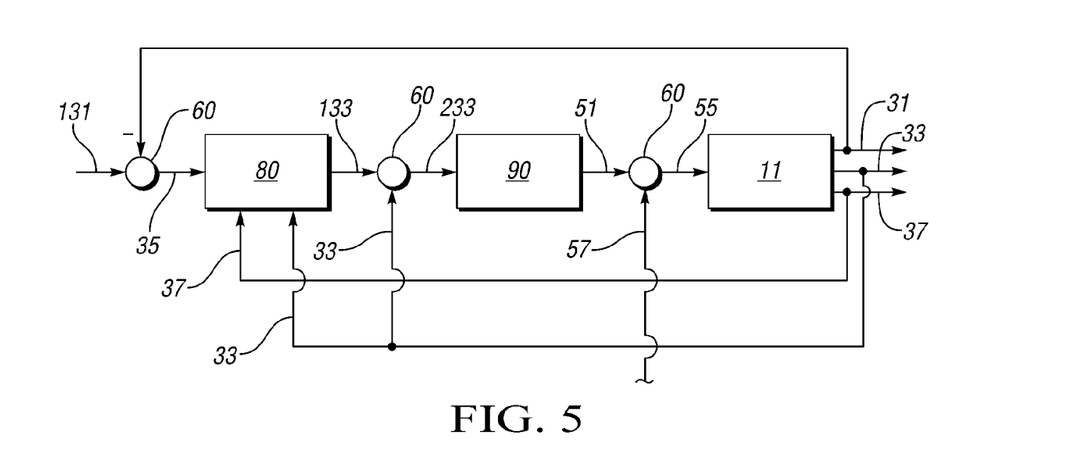
FIG. 5 is a schematic illustration of a two-tier control architecture for controlling the tendon-driven robotic finger shown in FIGS. 2 and 4.

Referring to FIG. 5, a schematic illustration of the control system 12 of FIG. 1 demonstrates the two-tier control scheme noted. The control system 12 includes an upper control loop and a lower control loop, i.e., the joint controller 80 and the actuator controller 90, respectively. The joint controller 80 processes signals describing a vector of joint position (q), represented as arrow 31, and a desired or reference joint position ($q_d$), represented as arrow 131, via a processing node 60 to thereby calculate a joint position error ($q-q_d$), i.e., arrow 35. Likewise, a tendon force (f) is shown as arrow 37, and a tendon position (x) is shown as arrow 33. Another processing node 60 takes the commanded tendon position ($x_d$), shown as arrow 133, calculates the tendon position error ($x-x_d$) 233 and sends it down to the lower loop of the actuator controller 90.

The actuator controller 90 consists of a simple position controller on the actuator position; it is first tuned to maximize performance with a first-order response behavior to avoid overshoot. The joint controller 80 can consist of either a force-based controller on the finger joints as understood in the art, or a position-based controller.

A new position controller is set forth herein that implements a discrete version of a velocity controller, wherein the current positions of the actuators are continuously fed back and combined with a delta vector based on the joint errors. Based on the above kinematic relationships, the commanded tendon position ($x_d$), i.e., arrow 133, can be written as:

$$x_d = x - k_p R^T \Delta q,$$

where $\Delta q$ represents the joint position error ($q-q_d$), i.e., arrow 35 as shown in FIG. 5, and $k_p$ is a scalar constant gain. This control law zeros the null-space displacement of the previous equation.

This control law produces a fast response that closes the steady-state error and maintains an over-damped behavior. However, it does not actively constrain actuator positions to the range-space. Hence, disturbances can cause disproportionate changes to the actuator positions, changing the internal tensions. This may be exacerbated by the fact that the tendon 50 shown in FIG. 3 cannot resist compression. To resolve this, the output is projected into the range-space of the finger 14, which allows the lower loop to actively servo to the range-space. This provides the final control law for the upper-loop: $x_d = R^+ Rx - k_p R^T \Delta q$. The range-space constraint of this equation requires the two-tiered hierarchy shown in FIG. 5. This range-space constraint allows the system to resist motion in the null-space, and thus to nominally maintain the initial internal tensions placed on the tendon.

An alternative scheme for the position control law is based on a proportional-integral (PI) compensator. This law implements a feed-forward term for the final position of each of the actuators used with a PI term to eliminate steady-state error. If the system is initialized such that the initial tendon position x and joint position q are zero, then the actuator positions matching the desired joint positions ($q_d$), arrow 131, without changing the length of the tendon 50 of FIG. 3, are given by $R^T q_d$. Since the kinematic model may be imperfect, a PI compensator is used to eliminate any errors.

Thus, the commanded position ($x_d$), arrow 133, from the feed-forward control is as follows:

$$x_d = -R^T(k_p \Delta q + ki \int \Delta q dt).$$

This feed-forward term results in a fast rise time, while the PI term results in zero steady-state error.

When some but not all of a total number of available tension sensors for the finger 14 are available, the control system 12 can selectively apply position control for that finger, in conjunction with selective compliance for the tendons, thus complimenting the position control capabilities of the control system 12. Note that the different fingers 14 on a given hand 24 (see FIG. 2) can be simultaneously controlled using different controllers or control laws, e.g., with force-based control of one finger and position-based control of another.

A selective compliance value (arrow 57) may be defined as $k(f-f_d)s$, with k being a scalar constant and ($f-f_d$) being the tension error. The term s is a selection variable with an element for each tendon, e.g., with a value of 1 to turn compliance on and 0 to turn compliance off. Thus, downstream of the actuator controller 90, the selective compliance value 57 may be subtracted from the output 51 of the actuator controller, with s being selected by the control system 12 in a manner that is dependent upon whether selective compliance is desired (i.e., 1) or not desired (i.e., 0). The control signals (arrow 55), also shown in FIG. 1, are ultimately transmitted to the robot 11 as a motor command which feeds back the joint positions (q) (arrow 31), tendon positions (x) (arrow 33), and tendon tensions (f) (arrow 37).

When all tension sensors are available in a given finger 14, the control system 12 of FIG. 1 uses the force-based control law for controlling that particular finger. The following example control law decouples the motion in the joint space of the finger 14. The following equation for a desired tendon position ($x_d$) applies:

$$x_d = x - k_p \dot{x} - P^T K_p(T - T_d),$$

where T=Pf, and P is a matrix that concatenates R and $w^T$ on top of each other. The values $k_p$ and $k_d$ are user-defined proportional and integral gains, respectively.

Figure 6:
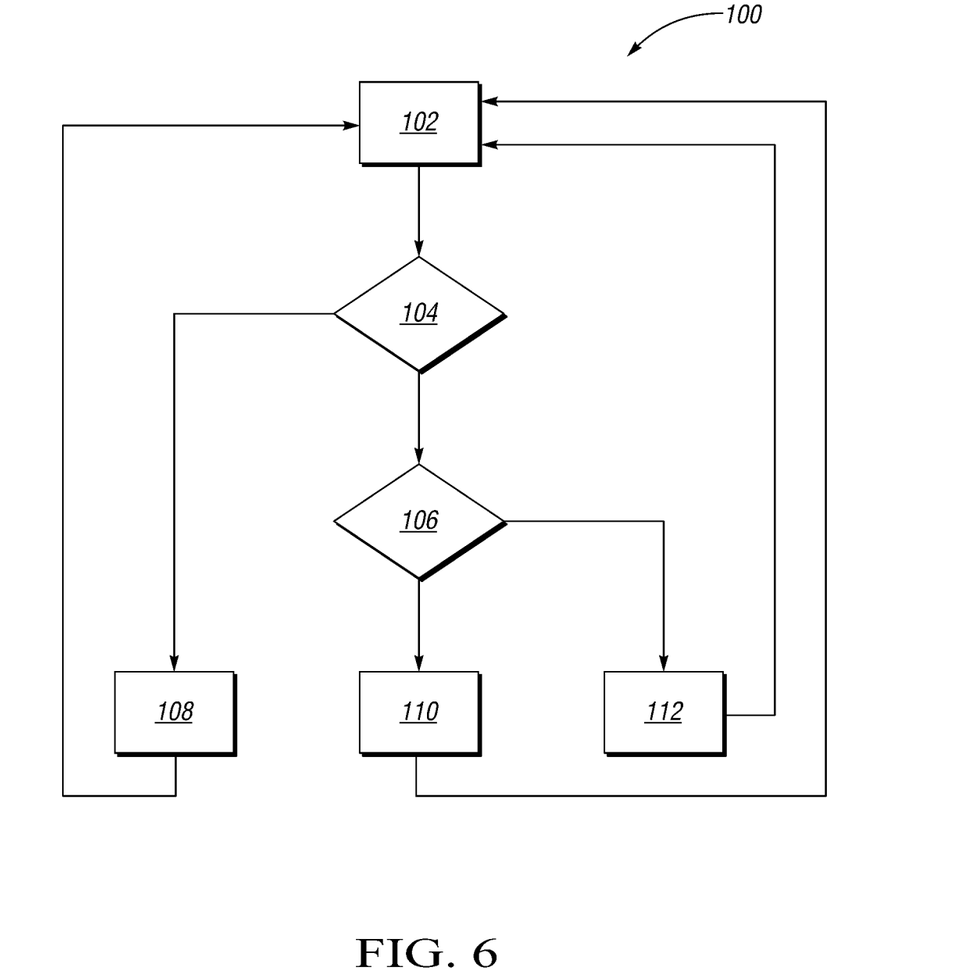
FIG. 6 is a flow chart describing the present method for controlling the tendon-driven robotic finger shown in FIGS. 2 and 4.

Referring to FIG. 6, and with reference to the structure shown in the preceding Figures, the present method 100 according to one possible embodiment begins at step 102, wherein the control system 12 determines the number of available tension sensors in a finger 14 being controlled. Step 102 may include receiving an input signal indicative of the status of each of the tension sensors 58 in a given finger 14, e.g., by automatically querying the tension sensors with a status request command or "ping", and then recording a status indicating that the tension sensor is available, i.e., online and properly functioning, whenever the queried tension sensor successfully replies to the ping.

Alternatively, signals may be periodically transmitted from the tension sensor 58 at calibrated intervals, with the interruption or discontinuation of transmission of such signals indicating the non-availability of a particular sensor. Additional embodiments may include the tension sensor 58 reading erroneous values relative to calibrated thresholds, recording a manual input of the non-available status of a given sensor into the control system 12 by a programmer or user, processing of sensor error codes or flags, etc.

At step 104, the control system 12 of FIG. 1 determines whether all tension sensors 58 for a particular finger 14 are available, e.g., by comparing a known total number of tension sensors to the number of available sensors determined at step 102. If all of the tension sensors 58 for a finger 14 are available, the method 100 proceeds to step 108. Otherwise, the method 100 proceeds to step 106.

At step 106, the control system 12 determines whether at least some of the tension sensors 58 are available for the finger 14 being evaluated. If so, the method 100 proceeds to step 110. Otherwise, the method 100 proceeds to step 112.

At step 108, with the control system 12 having previously determined at step 104 that all of the total number of tension sensors 58 in a finger 14 are available for use in that finger, the control system of FIG. 1 controls the finger using the force-based control law alone, as set forth above. The method 100 then repeats step 102 in a loop to determine whether there has been a change in the number of available tension sensors 58.

At step 110, with the control system 12 having determined at step 106 that only some of the tension sensors 58 in a given finger 14 are available for use in that finger, the control system of FIG. 1 controls the finger using the position-based control law in conjunction with selective compliance, as set forth above. The method 100 then repeats step 102 in a loop to determine whether there has been a change in the number of available tension sensors 58.

At step 112, with the control system 12 of FIG. 1 having determined at step 106 that none of the tension sensors 58 are available for use in the finger 14 being controlled, the control system of FIG. 1 controls the finger using position-based control law alone, as set forth above. The method 100 then repeats step 102 in a loop to determine whether there has been a change in the number of available tension sensors 58.

Accordingly, the control system 12 of FIG. 1 provides force control to protect the tendons of a given finger 14 in combination with robustness with respect to tension sensor failure. Effective control is provided over each finger 14 without requiring tension sensing. When tension sensing is unavailable, the control law with its two-tier control architecture described above with reference to FIG. 5 provides position control that is fast without overshoot, while maintaining nominal internal tension levels on the finger. Compliance is available in conjunction with position control to protect the tendons even when a full set of tension sensors is unavailable. Thus, the robot 11 of FIG. 1 is able to operate at a higher level of performance with an enhanced robustness.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
a robotic finger driven by a tendon, wherein the robotic finger includes a plurality of joints and a tension sensor positioned in or along the robotic finger;
an actuator connected to the tendon and operable to move the robotic finger, via tensioning of the tendon, with respect to at least one of the joints of the robotic finger; and
a control system providing a two-tier control architecture or hierarchy, including a joint-level controller which forms an upper control loop and an actuator-level controller which forms a lower control loop of the two-tier control architecture or hierarchy, wherein the control system is configured for:
determining whether the tension sensor is functioning properly or otherwise available in the robotic finger to measure a tension value of the tendon;
selectively controlling the robotic finger via a force-based control law or a position-based control law, via the joint-level controller, when the tension sensor is available in the robotic finger; and
selectively controlling the robotic finger via only the position-based control law, solely via the actuator controller, when the tension sensor is not available in the robotic finger to measure the tension value.

2. The robotic system of claim 1, further comprising a plurality of the tendons each having a corresponding tension sensor, wherein the control system is configured for selectively controlling the robotic finger via the force-based control law or the position-based control law, via the joint-level controller, when all of the tension sensors are available, and via only the position-based control law via the actuator-level controller when none of the tension sensors are available.

3. The robotic system of claim 2, wherein the control system is further configured for selectively injecting a compliance value to the position-based control law when only some of the tension sensors are available.

4. The robotic system of claim 3, wherein the compliance value is a function of a tension error determined as a difference between a desired tension and an actual tension of one of the tendons.

5. The robotic system of claim 1, where any commanded actuator positions for the actuator that are sent down to the actuator-level controller are constrained by the control system to the range-space of the robotic finger.

6. The robotic system of claim 1, further comprising a hand having a plurality of the robotic fingers, with each robotic finger having a plurality of the tendons, and with each of the plurality of tendons having a corresponding tension sensor, wherein each robotic finger is independently controllable with respect to the other robotic fingers in a manner that is dependent on the number of available tension sensors in the robotic finger that is being independently controlled.

7. The robotic system of claim 1, wherein the lower control loop actively servos to an actuator position of the robotic finger to allow the robotic finger to resist motion in the null-space of a tendon map matrix for the robotic finger, while also nominally maintaining an initial internal tension on the tendon.

8. A control system for a robotic finger driven by a tendon and having a plurality of joints, an actuator connected to the tendon that is operable to move the robotic finger via the tendon with respect to at least one of the joints, and a tension sensor positioned in or along the robotic finger, the control system comprising:
a host machine; and
a non-transitory computer-readable medium on which is recorded a control process providing a two-tier control architecture for controlling the finger;
wherein the host machine is configured for providing a two-tier control architecture or hierarchy, including an upper control loop and lower control loop of the two-tier control architecture or hierarchy, and is further configured for:
executing the control process from the computer-readable medium to thereby determine the availability of a tension sensor in the robotic finger suitable for measuring a tension value, including determining whether the tension sensor is functioning properly or otherwise available to measure a tension value of the tendon, and for selectively controlling the robotic finger:
via the upper control loops to selectively apply a force-based control law or a position-based control law when the tension sensor is available to measure the tension value of the tendon; and via only the lower control loop using only the position-based control law when the tension sensor is not available to measure the tension value.

9. The control system of claim 8, wherein the robotic finger includes a plurality of the tendons each having a corresponding tension sensor, and wherein the host machine is configured for selectively controlling the robotic finger using only the upper control loop, via the force-based control law, when all of the plurality of tension sensors are available in the finger, and via only the lower control loop using only the position-based control law when none of the plurality of tension sensors are available.

10. The control system of claim 9, wherein the host machine is further configured for selectively injecting a compliance value to the position-based control law when only some of the tension sensors are available.

11. The control system of claim 10, wherein the compliance value is a function of a tension error determined by the host machine as a difference between a desired tension and an actual tension of one of the tendons.

12. The control system of claim 8,
wherein the host machine includes a joint controller and an actuator controller, and wherein:
the joint controller is configured for selectively executing the force-based control law or the position-based control law in the upper control loop of the two-tier control architecture or hierarchy to thereby respectively control the force or the position of the joints of the robotic finger; and
the actuator controller is configured for executing only the position-based control law in the lower control loop of the two-tier control architecture or hierarchy to thereby control the position of the actuator.

13. The control system of claim 8, further comprising:
a hand having a plurality of the robotic fingers, with each of the robotic fingers having a plurality of tendons, and with each of the plurality of tendons having a corresponding tension sensor, wherein each of the robotic fingers is independently controllable with respect to the other robotic fingers in a manner dependent on the number of available tension sensors in the robotic finger that is being independently controlled.

14. A method for controlling a tendon-driven robotic finger in a robotic system, wherein the robotic finger is driven by a tendon and has a plurality of joints, and wherein an actuator is connected to the tendon and is operable to move the robotic finger with respect to at least one of the joints via tensioning of the tendon, the method comprising:
determining the availability of a tension sensor for measuring a tension value of the tendon; and
selectively controlling the robotic finger, via a joint-level controller of a control system, using a force-based control law or a position-based control law, when the tension sensor is available to measure the tension value; and
selectively controlling the robotic finger, via an actuator-level controller of the control system, using only the position-based control law when the tension sensor is not available to measure the tension value;
wherein the joint-level controller and the actuator-level controller form a respective upper level and lower level of a two-tier control architecture or hierarchy.

15. The method of claim 14, wherein the robotic finger has a plurality of the tendons each having a corresponding tension sensor, the method further comprising:
selectively controlling the robotic finger via the force-based control law or the position-based control law, via the joint-level controller, when all of the tension sensors are available, and via only the position-based control law, via the actuator-level controller, when none of the tension sensors are available.

16. The method of claim 15, further comprising:
selectively injecting a compliance value to the position-based control law when only some of the tension sensors are available.

17. The method of claim 16, further comprising:
calculating the compliance as a function of a tension error, wherein the tension error is determined as a difference between a desired tension and an actual tension of one of the tendons.

18. The method of claim 14, further comprising
constraining, via the control system, any commanded actuator positions for the actuator that are sent down to the actuator controller to the range-space of the robotic finger.

* * * * *